Oct. 13, 1925.
G. C. GOODE
1,557,452
TRANSMISSION HOUSING SUPPORT
Filed April 10, 1922
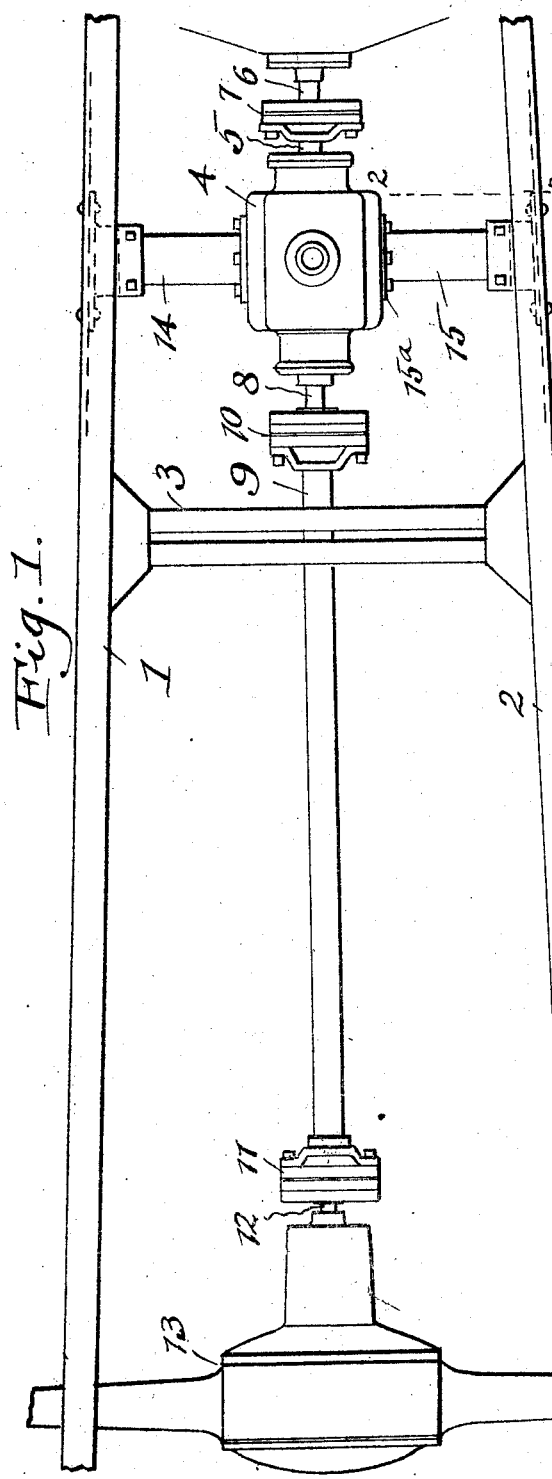
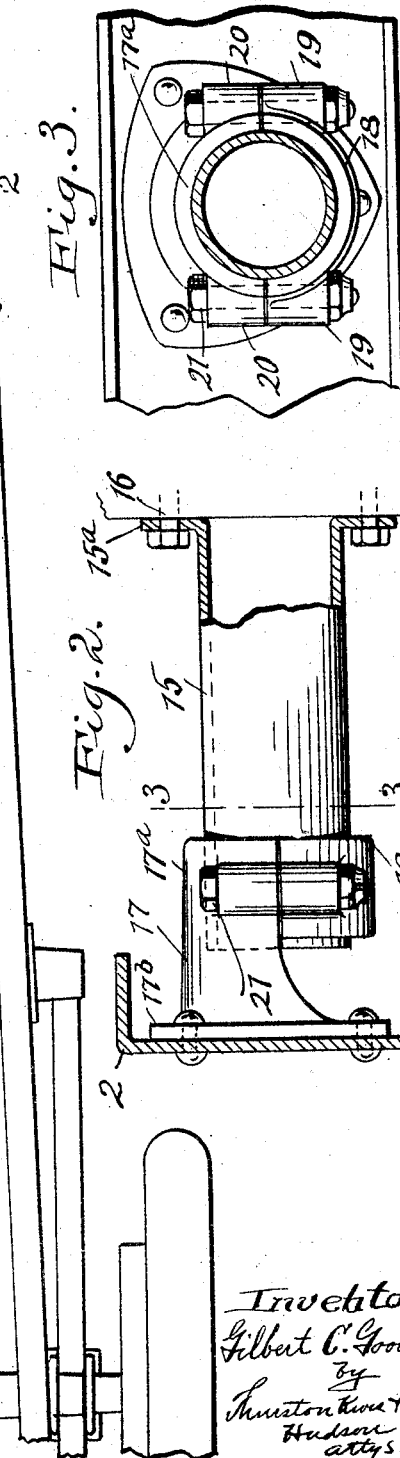

Patented Oct. 13, 1925.

1,557,452

UNITED STATES PATENT OFFICE.

GILBERT C. GOODE, OF CLEVELAND, OHIO, ASSIGNOR TO THE WHITE MOTOR COMPANY, OF CLEVELAND, OHIO, A CORPORATION OF OHIO.

TRANSMISSION-HOUSING SUPPORT.

Application filed April 10, 1922. Serial No. 551,037.

*To all whom it may concern:*

Be it known that I, GILBERT C. GOODE, a citizen of the United States, residing at Cleveland, in the county of Cuyahoga and State of Ohio, have invented a certain new and useful Improvement in Transmission-Housing Supports, of which the following is a full, clear, and exact description.

The present invention relates to motor vehicle construction and is more particularly concerned with the mounting of the transmission housing, together with the connections from the engine shaft to the transmission gears, and the connection between the transmission gears and the driving shaft to the rear axle.

One of the objects of the invention is to provide a simple mounting for a transmission housing and thereby enable an easy disassembling of the transmission for purposes of repair or removal.

Reference should be had to the accompanying drawings forming a part of this specification, in which Fig. 1 is a top plan view of a portion of a chassis showing the transmission housing, the mounting therefor, and the connections between the transmission gears and the driving shaft and the propelling shaft. Fig. 2 is a section upon the line 2—2 of Fig. 1; Fig. 3 is a section on the line 3—3 of Fig. 2.

Referring to the drawings, 1 and 2 indicate the side members of a vehicle chassis, and 3 a cross member which connects the side members of the chassis.

The transmission housing or casing is represented at 4, and extending from this casing at one end thereof is the shaft 5 which is connected with the engine shaft 6 by means of a flexible coupling 7. From the other side of the transmission housing there extends the shaft 8 which is connected with the propelling shaft 9 by means of a flexible coupling 10. At the opposite end of the shaft 9 there is a flexible coupling 11 which connects the shaft 9 with the shaft 12, which shaft 12 is connected with the differential mechanism within the rear axle housing 13.

The differential housing 4 is supported by two members 14 and 15, each of which is preferably tubular, and at one end is provided with a flange such as indicated at $15^a$, which flange is secured to the side wall of the differential by means of bolts or rivets or the equivalents, such as suggested at 16 in Fig. 2.

The outer end of the arm 15 co-operates with a bracket 17 which bracket has an upper arc-shaped portion $17^a$ which is secured to the side member of the chassis in any desired manner, as for instance, by providing the member 17 with a flange $17^b$ which is riveted or bolted to the side member of the chassis. Co-operating with the arc-shaped portion 17 is an arc-shaped cap 18. This cap member is provided with sleeves at the opposite sides thereof which are represented at 19, which align and co-operate with similar sleeves 20 carried by the arc-shaped member $17^a$. These sleeves, both 19 and 20, have aligned openings which are adapted to receive bolts held in place by nuts, such as indicated by 21.

The end of the member 15 co-operates with the member 17 and the cap 18, so that when in the position shown in Fig. 2 the end of the arm or member 15 is supported by the cap 18. The construction which has just been described is duplicated with respect to the arm 14, and the side member 1 of the chassis.

It will be seen that by loosening the nut and bolt structures 21 and removing the cap 18 that the transmission housing and the arms 14 and 15 are released, so that they may be lowered or raised. It will also be seen that if the flexible coupling 7 be disconnected with respect to either the shaft 6 or the shaft 5, it may be stated that usually it will be disconnected from the shaft 5, and the caps 18 removed, it will permit the lowering of the transmission housing without disassembling the same with respect to the shaft 9, this being permitted because of the flexible couplings 10 and 11.

This is a very desirable situation for frequently it is possible to repair a transmission housing by simply removing it to the extent indicated and making the necessary repairs. The particular arrangement which has been described will enable the dismounting of the transmission casing with respect to the chassis in a very ready manner, and thereby enabling repairs to be quickly made.

Of course, if it be desired to entirely remove the transmission housing, then it will be necessary to disconnect the shaft 8 from the shaft 9 by dismantling the flexible coupling 10.

Having described my invention, I claim:—

1. In a vehicle construction, the combination with opposite side frame members of the vehicle, of a transmission housing located between the same, the transmission having front and rear shafts connected by flexible couplings to the motor and axle propelling shafts, oppositely extending arms rigidly secured to the transmission housing intermediate the ends thereof, brackets carried by the said frame members and cooperating with the outer ends of said arms, and supporting said arms in a manner to permit release of the arms to lower the transmission housing.

2. In a vehicle construction, the combination with oppositely disposed supporting members, of a transmission housing located between the same, a pair of aligned oppositely extending arms carried by the transmission housing intermediate the ends thereof, brackets carried by the said supporting members and cooperating with the outer ends of said arms, removable cap members associated with the under side of said brackets whereby when the cap members are removed the arms are released and the transmission housing may be removed.

3. In a vehicle construction, the combination with oppositely disposed supporting members, of a transmission housing located between the same, a pair of aligned oppositely extending arms carried by the transmission housing intermediate the ends thereof, brackets carried by said supporting members and co-operating with the outer ends of said arms, removable members carried by said brackets which when removed release the said arms, the said transmission housing having therein a driven shaft extending on the outside thereof, a drive shaft, a flexible coupling between said drive shaft and said transmission shaft, a driven shaft, and a flexible coupling connecting said driven shaft with the drive shaft, said construction being such as to permit the lowering of the transmission casing without disconnecting the drive shaft.

4. In a vehicle construction, the combination with oppositely disposed supporting members, of a transmission housing located between the same, a pair of aligned tubular arms extending from opposite sides of the transmission housing intermediate the ends thereof, each of said tubular arms being provided with a flanged portion which is attached to the said housing, brackets carried by said supporting members and co-operating with the outer ends of said arms each of said bracket members comprising a part which engages with the upper portion of the said arms and having a removable cap which engages with the under portion of said arms whereby upon removal of the caps the transmission may be lowered.

In testimony whereof, I hereunto affix my signature.

GILBERT C. GOODE.